United States Patent
Sporck et al.

(10) Patent No.: US 9,276,430 B2
(45) Date of Patent: Mar. 1, 2016

(54) MASTER-SLAVE MULTI-PHASE CHARGING

(71) Applicant: QUALCOMM Incorporated, San Diego, CA (US)

(72) Inventors: Christian G Sporck, Campbell, CA (US); Giovanni Garcea, San Jose, CA (US); Shadi Hawawini, San Jose, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 213 days.

(21) Appl. No.: 14/065,752

(22) Filed: Oct. 29, 2013

(65) Prior Publication Data

US 2014/0347001 A1 Nov. 27, 2014

Related U.S. Application Data

(60) Provisional application No. 61/827,443, filed on May 24, 2013.

(51) Int. Cl.
| | |
|---|---|
| H02J 7/00 | (2006.01) |
| H02J 1/10 | (2006.01) |
| H02J 5/00 | (2006.01) |
| H02J 7/02 | (2006.01) |

(52) U.S. Cl.
CPC .................. *H02J 7/007* (2013.01); *H02J 1/102* (2013.01); *H02J 5/005* (2013.01); *H02J 7/008* (2013.01); *H02J 7/0091* (2013.01); *H02J 7/025* (2013.01); *H02J 2007/0059* (2013.01); *H02J 2007/0062* (2013.01)

(58) Field of Classification Search
CPC ........... H02J 7/007; H02J 1/102; H02J 5/005; H02J 7/025; H02J 7/0091; H02J 2007/0059; H02J 2007/0062; H02J 7/008
See application file for complete search history.

(56) References Cited

U.S. PATENT DOCUMENTS

| | | | |
|---|---|---|---|
| 7,135,836 B2 | 11/2006 | Kutkut et al. | |
| 7,290,126 B2 * | 10/2007 | Yamakawa | G06F 1/206 375/238 |
| 7,394,671 B2 * | 7/2008 | Fukumoto | H02M 7/53806 363/134 |
| 7,656,132 B2 * | 2/2010 | So | H01M 10/44 320/134 |
| 7,759,919 B2 * | 7/2010 | Bernacchia | H02M 3/1584 323/272 |
| 7,777,455 B1 * | 8/2010 | Martin | H02J 7/0055 320/137 |

(Continued)

FOREIGN PATENT DOCUMENTS

| | | |
|---|---|---|
| EP | 1870979 A1 | 12/2007 |
| JP | H1028338 A | 1/1998 |

(Continued)

OTHER PUBLICATIONS

International Search Report and Written Opinion—PCT/US2014/039380—ISA/EPO—Sep. 23, 2014.

(Continued)

*Primary Examiner* — Naum B Levin
(74) *Attorney, Agent, or Firm* — Fountainhead Law Group P.C.

(57) ABSTRACT

A multi-phase charging circuit comprises a device that can be configured for master mode operation or slave mode operation. In master mode operation, the device generates a control signal and a clock signal to control operation of a switching circuit for generating charging current. In slave mode operation, the device receives externally generated control and clock signals to control operation of its switching circuit.

20 Claims, 15 Drawing Sheets

(56) References Cited

U.S. PATENT DOCUMENTS

| | | | |
|---|---|---|---|
| 7,777,462 B2 * | 8/2010 | Kudo | H02M 3/1584 323/272 |
| 7,778,049 B2 * | 8/2010 | Morota | H02M 3/33507 363/21.12 |
| 8,441,235 B2 | 5/2013 | Shi et al. | |
| 8,482,340 B2 | 7/2013 | Shay et al. | |
| 8,497,666 B2 * | 7/2013 | Nagasawa | H02M 3/1584 323/238 |
| 2004/0212347 A1 | 10/2004 | Fogg | |
| 2007/0076453 A1 | 4/2007 | Schultz et al. | |
| 2007/0291523 A1 * | 12/2007 | Fukumoto | H02M 7/53806 363/134 |
| 2009/0160407 A1 | 6/2009 | Hwang | |
| 2011/0110130 A1 | 5/2011 | Wang et al. | |
| 2011/0169471 A1 | 7/2011 | Nagasawa | |
| 2012/0181983 A1 | 7/2012 | Khan et al. | |
| 2014/0266010 A1 * | 9/2014 | Newlin | H02J 7/0052 320/107 |
| 2014/0347003 A1 * | 11/2014 | Sporck | H02J 7/0052 320/107 |

FOREIGN PATENT DOCUMENTS

| | | |
|---|---|---|
| JP | 2011176959 A | 9/2011 |
| JP | 2012115006 A | 6/2012 |
| WO | 2011143158 A2 | 11/2011 |

OTHER PUBLICATIONS

Wang, J.B., et al., "Design Considerations of Microprocessor-Controlled Multiphase Battery Charger with Fast-Charging Strategy," IET Electric Power Applications, Mar. 2007, pp. 143-152, vol. 1 (2).

* cited by examiner

US 9,276,430 B2

MASTER-SLAVE MULTI-PHASE CHARGING

CROSS REFERENCE TO RELATED APPLICATIONS

The present disclosure claims priority to U.S. Provisional App. No. 61/827,443 filed May 24, 2013, the content of which is incorporated herein by reference in its entirety for all purposes.

BACKGROUND

Unless otherwise indicated herein, the approaches described in this section are not prior art to the claims in this application and are not admitted to be prior art by inclusion in this section.

As mobile computing devices (e.g., smart phones, computer tablets, and the like) continue to be used more widely, the need for fast charging of batteries becomes more significant. Advancements in fast battery charging techniques are being hampered by the high temperatures that result during fast charge sequences. In most cases, the high temperatures are caused by high inductor temperatures, which can exceed the temperature of the charging circuit.

SUMMARY

The present disclosure describes a multi-phase charging circuit for operation in a multi-stage parallel configuration to perform battery charging. The multi-phase charging circuit may include selection circuitry to configure the circuit for "master" operation or for "slave" operation. In master configuration, the multi-phase charging circuit may generate clock and control signals to control operation of the charging circuitry in the master-configured circuit itself, and provide those signals to one or more slave-configured circuits as externally generated signals. In slave configuration, the multi-phase charging circuit may use an externally generated clock signal to synchronize operation of its charging circuitry with the master-configured circuit. In some embodiments, the master configured device may provide additional control signals to the control operation in the slave-configured circuits.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, make apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
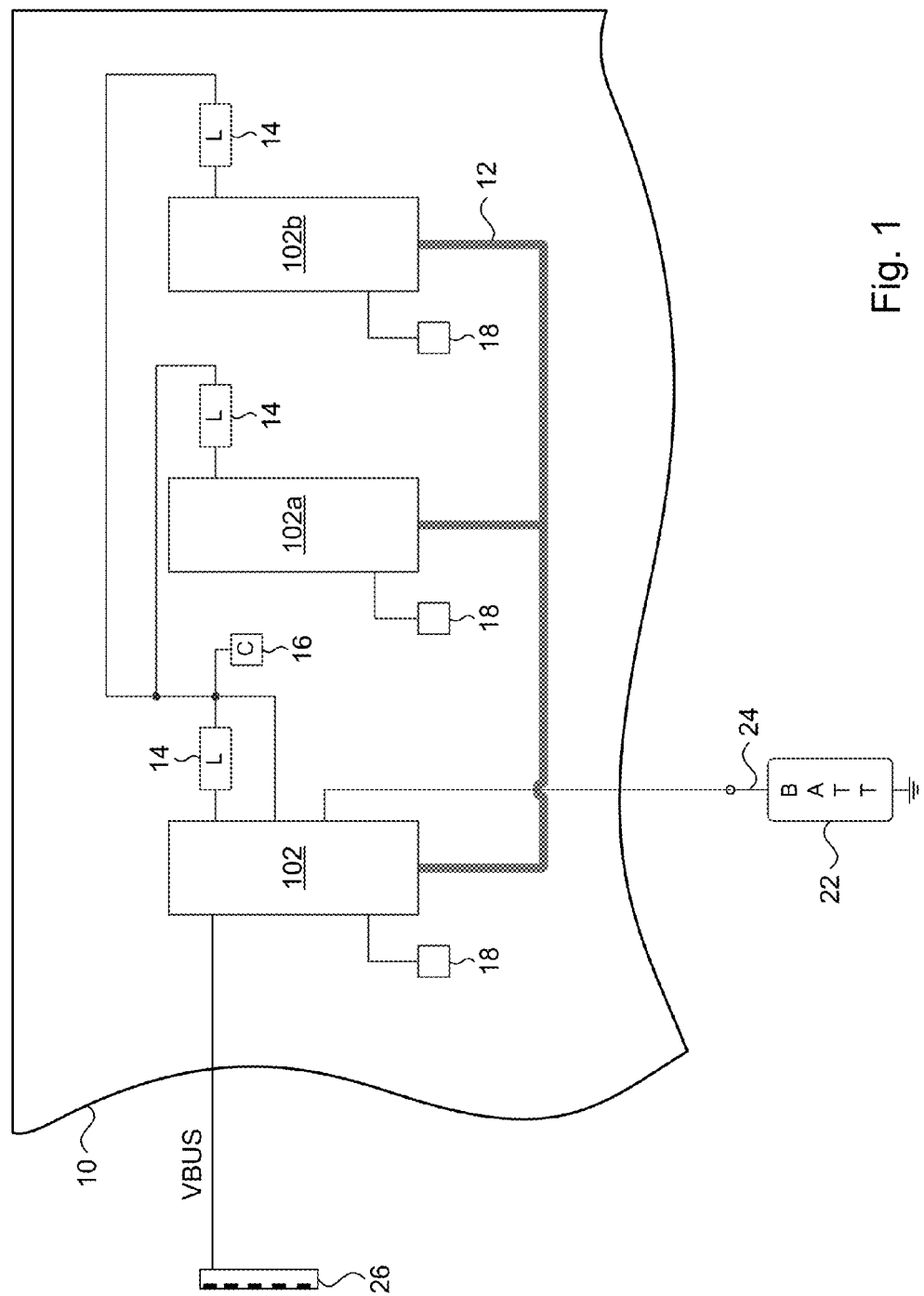
FIG. 1 shows a printed circuit board (PCB) level embodiment of the present disclosure.

FIG. 1 shows a portion of a printed circuit board (PCB) 10 populated with battery charging devices in accordance with the present disclosure. The PCB 10 may be a circuit board, for example, in a mobile computing device, a smart phone, and in general any electronic device. The PCB 10 may be populated with battery charging devices 102, 102a, 102b. It will be appreciated in the discussions to follow that fewer or more battery charging devices may be provided. Each of the battery charging devices 102, 102a, 102b may be embodied in any suitable integrated circuit (IC) packaging format (e.g., single in-line packaging, dual in-line packaging, surface mount devices, and so on) and interconnected on the PCB 10.

In some embodiments, the battery charging devices 102, 102a, 102b are identical devices that can be configured for different modes of operation. For example, device 102 may be configured for "master" mode operation, while devices 102a, 102b may be configured for "slave" mode operation. It will be understood that battery charging devices 102, 102a, 102b may include pins or terminals (not shown) that allow the devices to be interconnected on the PCB 10 using PCB traces, represented generally by 12.

In accordance with principles of the present disclosure, the battery charging devices 102, 102a, 102b may be connected to a battery 22 via a connection 24 (e.g., battery terminal) for coordinated charging of the battery by the battery charging devices. The battery 22 may comprise any known configuration of one or more cells (e.g., a single-cell configuration, a multi-cell, multi-stack configuration, etc.) and may be use any suitable chemistry that allows for recharging.

In some embodiments, the battery charging devices 102, 102a, 102b operate as buck converters, and in other embodiments the battery charging devices may comprise buck-boost converters. In some embodiments, the inductive component of the buck converter may be provided as external inductive elements 14 provided on the PCB 10. Accordingly, each battery charging device 102, 102a, 102b may be connected to a corresponding external inductive element 14, such as an inductor. The inductive elements 14 are "external" in the sense that they are not part of the charging ICs that comprise the battery charging devices 102, 102a, 102b. In accordance with the present disclosure, the capacitive component of the buck converters may be provided as an external capacitive element 16 on the PCB 10 that can be shared by each battery charging device 102, 102a, 102b. The capacitive element 16 is "external" in the sense that it is not part of the charging ICs that comprise the battery charging devices 102, 102a, 102b.

Further in accordance with the present disclosure, each battery charging device 102, 102a, 102b may be connected to a corresponding external selection indicator 18 to configure the device for master or slave mode operation. Each selection indicator 18 is "external" in the sense that it is not part of the charging IC that comprises the device. In some embodiments, the selection indicator 18 may be a resistive element. For example, a connection to ground potential (e.g., approximately 0Ω) may serve to indicate the device (e.g., 102) should operate in master mode. A non-zero resistance value (e.g., 10KΩ, 100KΩ, etc.) may serve to indicate that the device (e.g., 102a, 102b) should operate in slave mode. More generally, in other embodiments, the selection indicator 18 may be a source of a suitable analog signal or digital signal that can serve to indicate to the device 102, 102a, 102b whether to operate in master mode or slave mode.

Power to the battery charging devices 102, 102a, 102b may be externally provided via any suitable connector 26. Merely as an example, the connector 26 may be a USB connector. Power from the VBUS line of a USB connector may be connected to device 102 (e.g., at a USBIN terminal), which may then distribute the power to the other devices 102a, 102b via a MIDUSBIN terminal. These and other terminals will be described in more detail below.

Figure 1A:
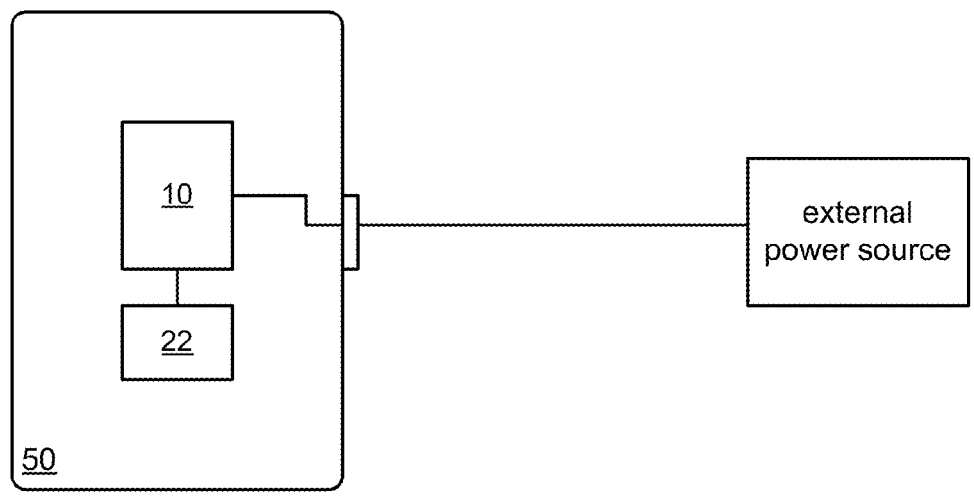
FIGS. 1A and 1B show additional illustrative embodiments in accordance with the present disclosure.
Figure 1B:
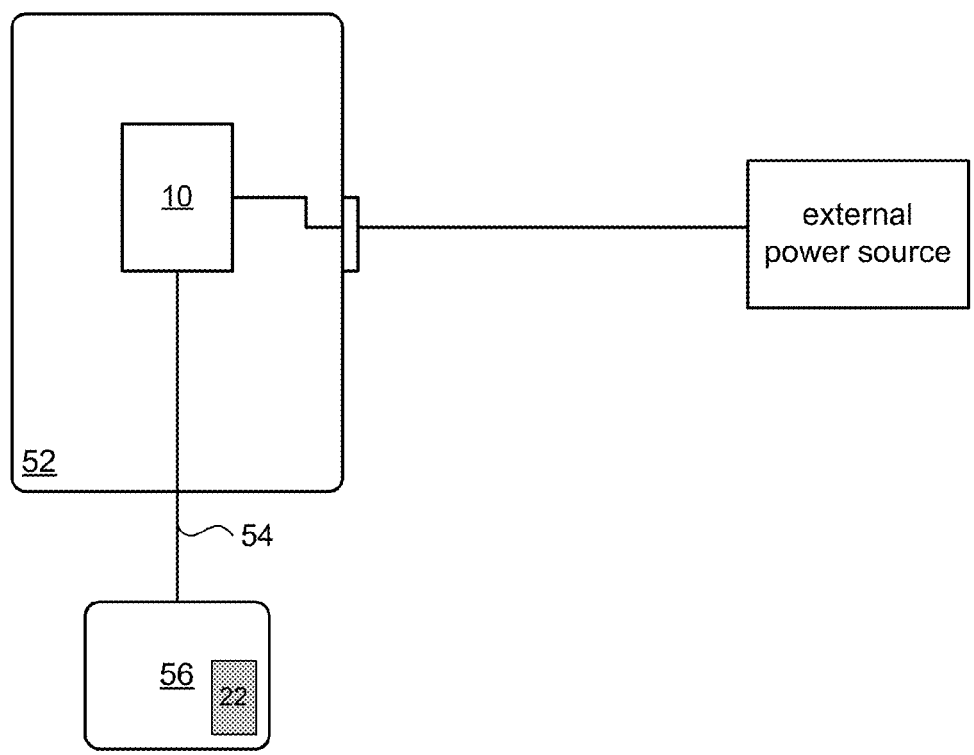

One of ordinary skill will appreciate that embodiments according to the present disclosure may include any electronic device. For example, FIG. 1A points out that the PCB 10 may be incorporated in any electronic device 50 to charge battery 22. FIG. 1B illustrates another configuration in which PCB 10 may be provided in a first electronic device 52 that has a connection 54 to a second electronic device 56 to charge battery 22 in the second electronic device. In some embodiments, the connection 54 may not be physical, for example, wireless energy transfer from device 52 may be provided using magnetic induction circuitry (not shown).

Figure 2:
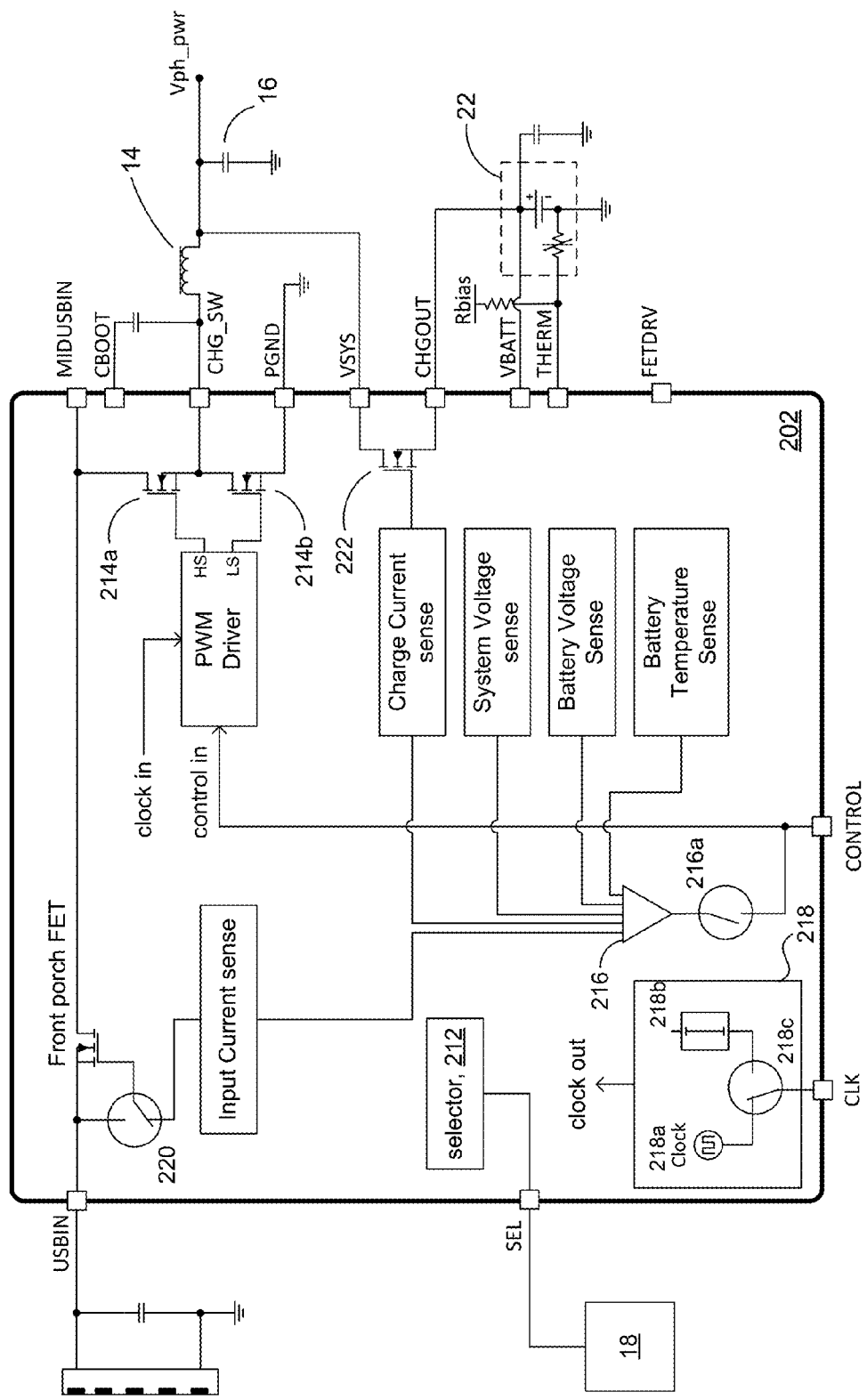
FIG. 2 shows a general view of a charging circuit in accordance with the present disclosure.

The discussion will now turn to details of battery charging device 102 in accordance with some embodiments of the present disclosure. FIG. 2 shows a simplified schematic representation of the battery charging device 102. In some embodiments, the battery charging device 102 may comprise a charging IC 202. It will be appreciated that in some implementations, the design of the charging IC may be implemented on two or more ICs. For purposes of discussion, however, we can assume a single charging IC implementation without loss of generality.

The charging IC 202 may comprise circuitry to provide battery charging functionality in accordance with principles of the present disclosure. In some embodiments, for example, the battery charging functionality may be provided using a buck converter, or a buck-boost converter, and so on. Accordingly, the charging IC 202 may include a high-side FET 214a and a low-side FET 214b that can be configured in a buck converter topology in conjunction with inductive element 14 and capacitive element 16.

A pulse width modulated (PWM) driver circuit may produce gate drive signals (HS, LS) at its switching output to switch the gates of respective FETs 214a and 214b. The PWM driver circuit may receive a current-mode control signal at its control input and a clock signal at its clock input to control the switching of FETs 214a and 214b. Power (Vph_pwr) from the buck converter may be connected to charge the battery 22 through battery FET 222 via the VSYS and CHGOUT terminals of the charging IC 202. The battery FET 222 may serve to monitor the charge current (e.g., using a charge current sense circuit).

In accordance with principles of the present disclosure, the control signal may be internally generated within the charging IC 202 or externally provided to the charging IC. For example, a feedback compensation network comprising various feedback control loops and a comparator 216 may serve as a source of an internally generated control signal. In a particular embodiment, the feedback control loops may include an input current sense circuit (e.g., senses input current at USBIN), a charge current sense circuit (e.g., senses current at VSYS and CHGOUT terminals using battery FET 222), a system voltage sense circuit (e.g., senses voltage at VSYS terminal), a battery voltage sense circuit (e.g., senses battery voltage at VBATT terminal), and a battery temperature sense circuit (e.g., senses battery temperature at THERM terminal). In other embodiments, the feedback control loops may comprise fewer, or additional, sense circuits. The comparator 216 may produce a reference that serves as the internally generated control signal.

The control signal produced by comparator 216 is "internal" in the sense that the control signal is generated by circuitry that comprise the charging IC 202. By comparison, a control signal is considered to be "externally" provided when the signal is received from a source external to the charging IC 202; e.g., via the CONTROL terminal of the charging IC. In some embodiments, a control selector 216a may be provided to select either the internal control signal generated by the comparator 216 or an externally generated control signal received on the CONTROL terminal to serve as the control signal for the PWM driver circuit.

In accordance with principles of the present disclosure, the clock signal may be internally generated within the charging IC 202 or externally provided to the charging IC. For example, the charging IC 202 may include a clock generator 218 to produce a clock signal (clock out). The clock generator 218 may include a clock generating circuit 218a and a delay element 218b. The clock generating circuit 218a may produce a clock signal that serves as an internally generated clock signal. The delay element 218b may receive an externally provided clock signal.

The clock signal produced by the clock generating circuit 218a is "internal" in the sense that the clock signal is generated by circuitry that comprise the charging IC 202, namely the clock generating circuit. By comparison, a clock signal is considered to be "externally" provided when the signal is received from a source external to the charging IC 202; e.g., via the CLK terminal of the charging IC. In some embodiments, a clock selector 218c may be provided to select either the internal clock signal generated by the clock generating circuit 218a or an external clock signal provided on the CLK terminal and delayed (phase shifted) by the delay element 218b to serve as the clock signal for the PWM driver circuit.

The charging IC 202 may include a selector circuit 212 to configure the charging IC to operate in "master" mode or "slave" mode according to the external selection indicator 18 provided on an SEL input of the charging IC. The selection indicator 18 may be a circuit, or a source of an analog signal (e.g., an analog signal generator) or a digital signal (e.g., digital logic). In some embodiments, for example, the selection indicator 18 may be an electrical connection to ground potential, either directly or through a resistive element. The selector circuit 212 may operate the control selector 216a and the clock selector 218c according to the selection indicator 18. The selector circuit 212 may also operate a switch 220 to enable or disable sensing of the current input in accordance with the selection indicator 18.

Figure 3:
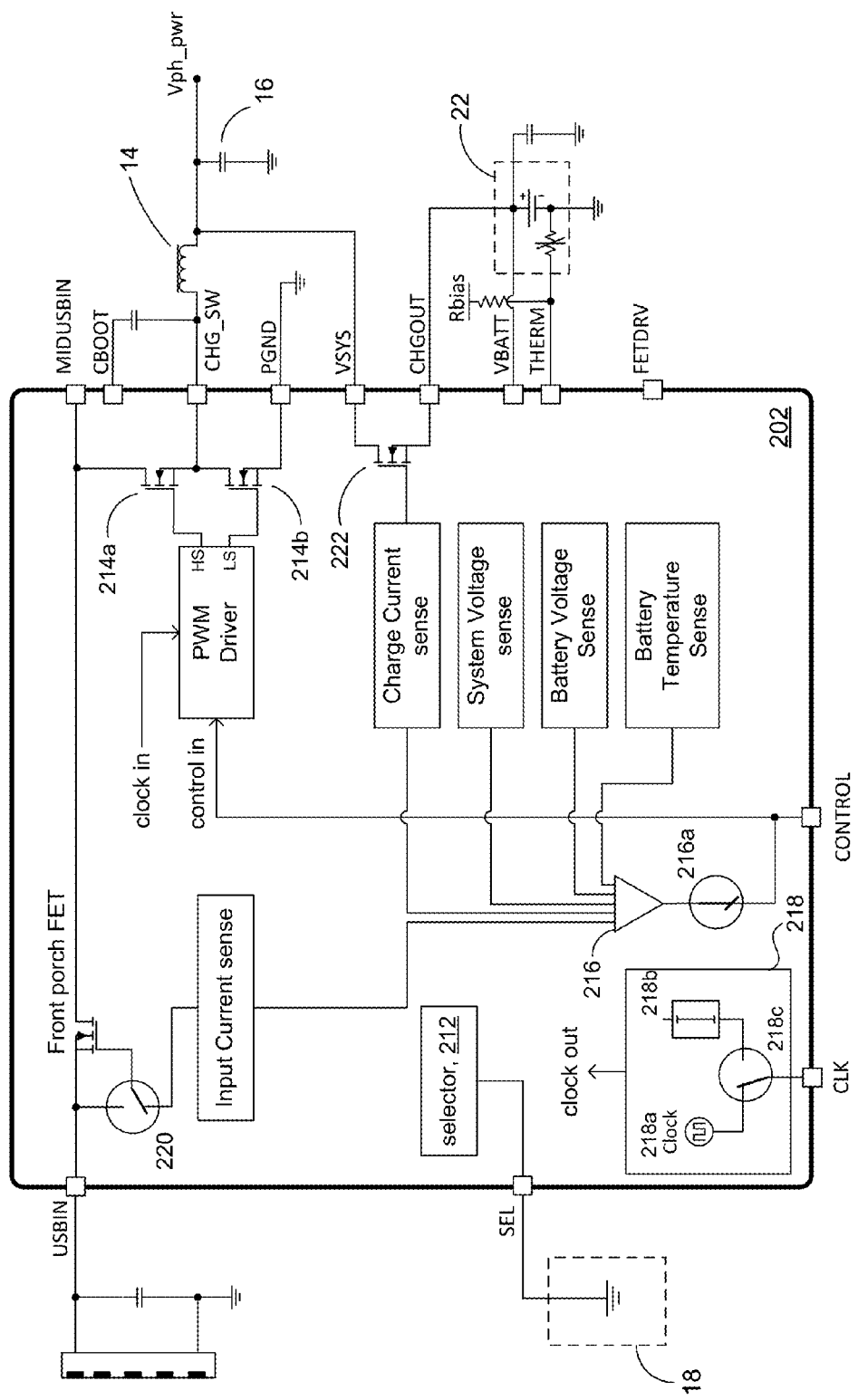
FIG. 3 shows a single-phase configuration of a charging circuit in accordance with the present disclosure.

In accordance with the present disclosure, the charging IC 202 may be configured as a single-phase standalone device, or used in a multi-phase configuration. The discussion will first describe a single-phase configuration. FIG. 3 illustrates an example of the charging IC 202 configured to operate as a standalone battery charger. The charging IC 202 may be configured using the SEL input to operate in master mode. In some embodiments, master mode operation in charging IC 202 may be designated by a selection indicator 18 that comprises a connection of the SEL input to ground potential. This convention for designating master mode operation will be used for the remainder of the disclosure with the understanding that, in other embodiments, other conventions may be adopted to indicate master mode operation.

In an embodiment, the selector 212 may be configured to respond to the presence of a ground connection at the SEL input by configuring the charging IC 202 for master mode operation. For example, the selector 212 may operate the control selector 216a in a first configuration to provide an internally generated control signal to the control input of the PWM driver circuit. The internally generated control signal is also provided to the CONTROL terminal of charging IC 202, which for the single-phase configuration shown in FIG. 3 is not relevant.

Similarly, the selector 212 may operate the clock selector 218c in a first configuration to provide an internally generated clock signal (e.g., via clock generating circuit 218a) to the clock input of the PWM driver circuit. The internally generated clock signal is also provided to the CLK terminal of charging IC 202, which for the single-phase configuration shown in FIG. 3 is not relevant. The selector 212 may also operate switch 220 to a configuration that enables input current sensing on the power input USBIN.

In operation, the master-mode configured charging IC 202 shown in FIG. 3 operates as a buck converter to charge battery 22. Feedback control to the PWM driver circuit is provided by the circuitry comprising the charging IC 202, and likewise, the clock signal to the circuit is provided from within the charging IC. The configuration is a "standalone" configuration in the sense that there is only one charging IC.

Figure 4A:
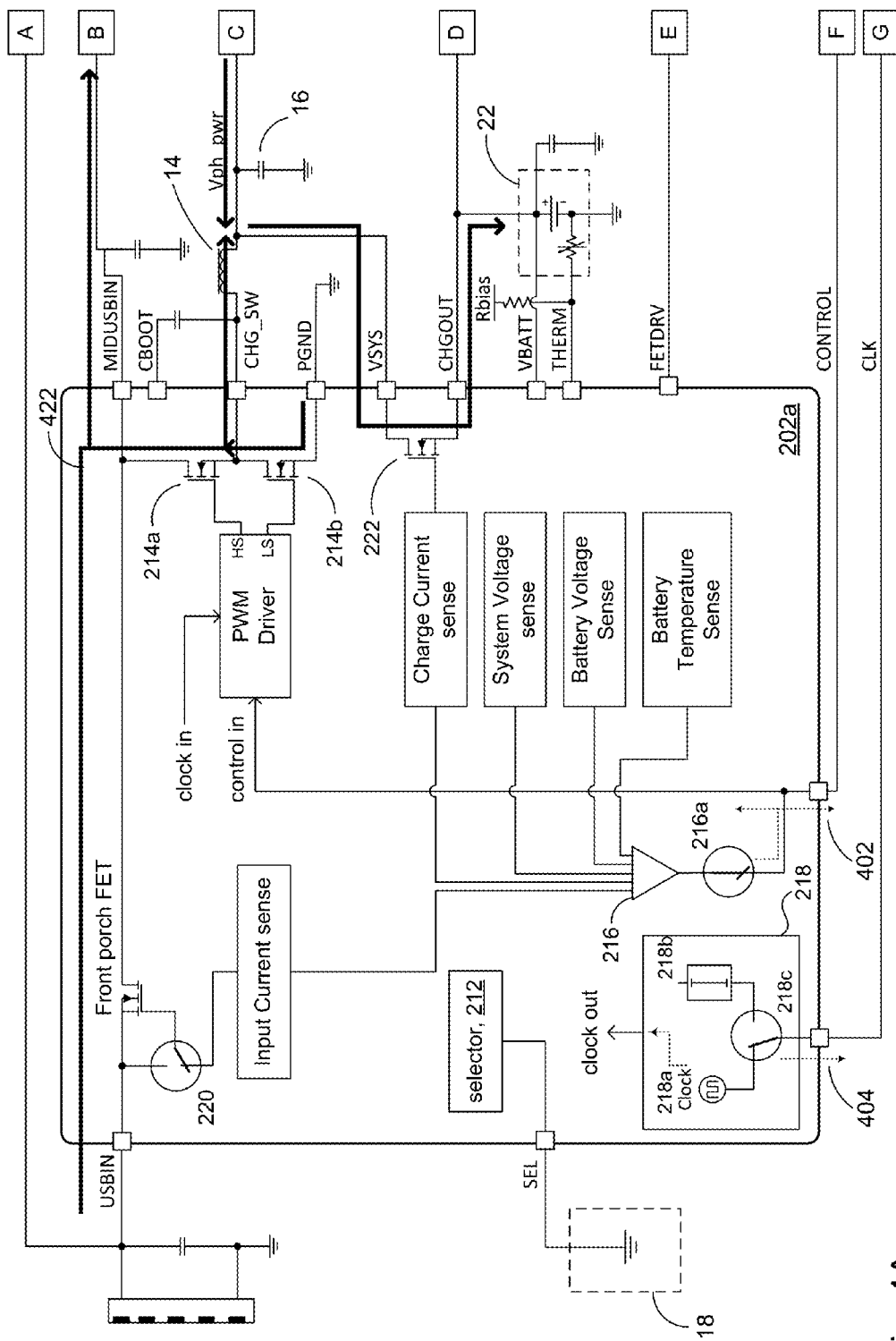
FIGS. 4A and 4B show a dual-phase configuration of charging circuits in accordance with the present disclosure.
Figure 4B:
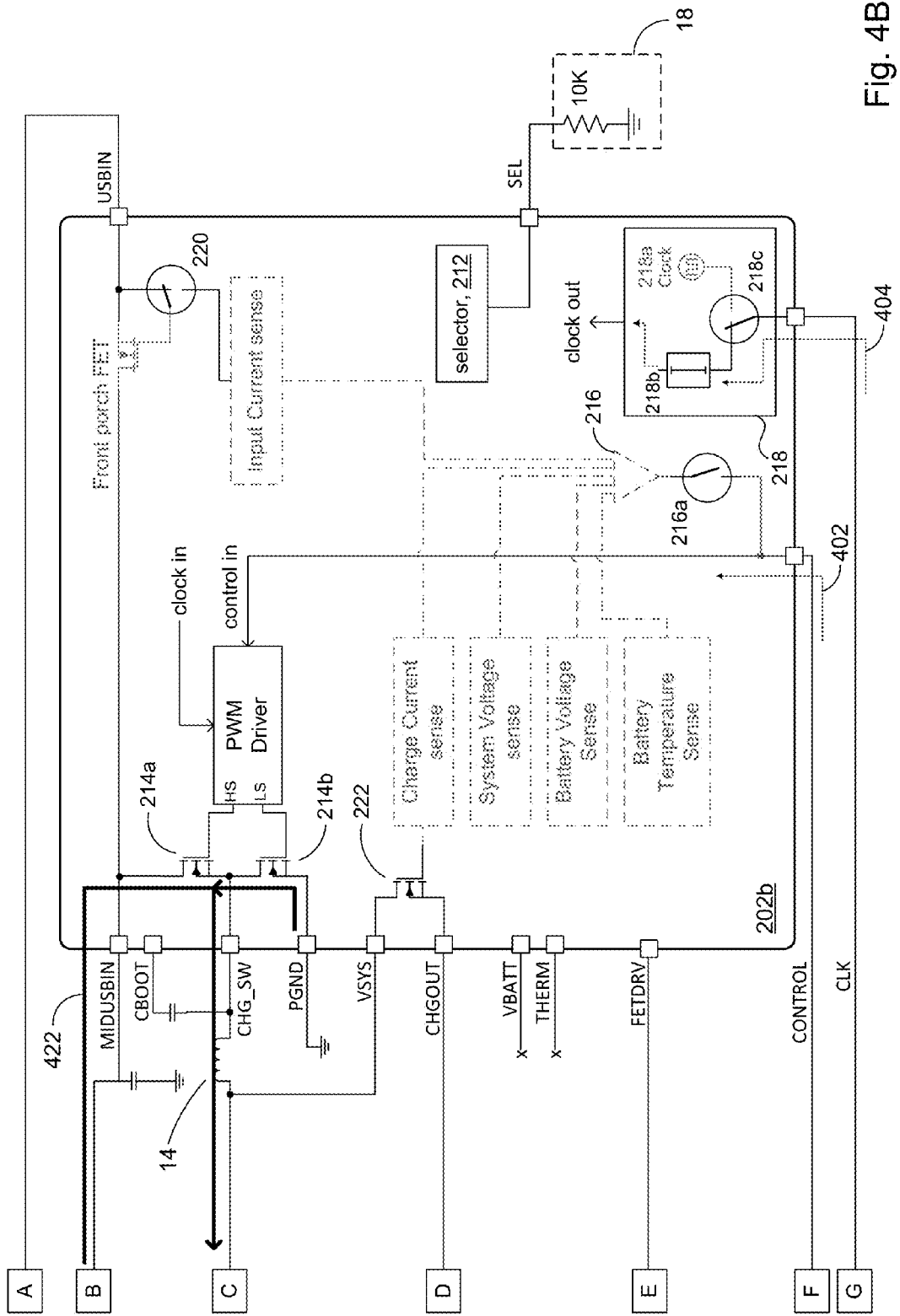

The discussion will now turn to a description of an example of a multi-phase configuration of the charging IC 202 in accordance with the present disclosure, and in particular a dual-phase configuration. In a dual-phase configuration, two charging ICs 202 are connected and operate together to charge a battery 22. One of the charging ICs 202 may be configured as a master device and the other as a slave device. FIGS. 4A and 4B show an example of charging ICs 202a and 202b configured to operate respectively as a master device and as a slave device. The charging ICs 202a, 202b are connected together at connections A, B, C, D, E, F, and G. The resulting current flow is illustrated in FIGS. 4A and 4B as flow 422.

The charging IC 202a shown in FIG. 4A is configured for master mode operation as described in FIG. 3. In accordance with the present disclosure, the control signal generated by the comparator 216 in charging IC 202a is provided as an externally generated control signal 402 (e.g., via the CONTROL terminal), in addition to serving as an internally generated control signal for the PWM driver circuit in the charging IC. Similarly, the clock signal generated by the clock generator 218 is provided as an externally generated clock signal 404 (e.g., via the CLK terminal), in addition to serving as an internally generated clock signal for the PWM driver circuit in the charging IC 202a.

Referring to FIG. 4B, the charging IC 202b is configured for slave mode operation. The charging IC 202b may be configured using the SEL input to operate in slave mode. In some embodiments, slave mode operation may be designated by a selection indicator 18 that comprises a resistive element. This convention for designating slave mode operation will be used for the remainder of the disclosure with the understanding that, in other embodiments, other conventions may be adopted to indicate salve mode operation. In a particular embodiment, for example, a 10K resistor may be used to indicate slave mode operation. It will be appreciated, of course, that another resistance value may be used. The selector 212 may be configured to respond to the detection of a 10KΩ resistance at the SEL input by configuring the charging IC 202b for slave mode operation.

In slave mode operation, the selector 212 may operate the control selector 216a in a second configuration to receive the externally generated control signal 402 that is received on the CONTROL terminal of the charging IC 202b. The control selector 216a provides the externally generated control signal 402 to the control input of the PWM driver circuit. Operation of the control selector 216a in the second configuration disconnects or otherwise effectively disables the feedback network in charging IC 202b from the PWM driver circuit. This "disconnection" is emphasized in the figure by illustrating the elements of the feedback network in charging IC 202b using broken grayed out lines.

The selector 212 in charging IC 202b may also operate the clock selector 218c in a second configuration to receive the externally generated clock signal 404 on the CLK terminal. The clock selector 218c provides the externally generated clock signal 404 to the delay element 218b. The clock signal that is provided to the PWM driver circuit comes from the delay element 218b, thus disconnecting or otherwise effectively disabling the clock generating circuit 218a in the charging IC 202b.

Switch 220 may be configured (e.g., by selector 212) to disable current sensing at the USBIN terminal of charging IC 202b. Power to the high- and low-side FETs 214a, 214b may be provided by the MIDUSBIN terminal via connection B. Similarly, charge current sensing in the slave-configured charging IC 202b may be disabled by disabling its battery FET 222.

As can be appreciated from the foregoing description, operation of the PWM driver circuit in the slave-mode charging IC 202b is controlled by the control signal and clock signal that is generated in the master-mode charging IC 202a and provided to the slave-mode charging IC 202b respectively as externally generated control and clock signals 402, 404. From the point of view of the slave-mode charging IC 202b, the control and clock signals generated in the master-mode charging IC 202a are deemed to be "externally generated."

The master-mode charging IC 202a may synchronize with the slave-mode charging IC 202b by asserting a signal on the FETDRV terminal. For example, when the master-mode charging IC 202a pulls the FETDRV terminal LO, the PWM driver circuit in the slave-mode charging IC 202b is disabled. When the master-mode charging IC 202a pull the FETDRV terminal HI, the PWM driver circuit in the slave-mode charging IC 202b begins switching. In some embodiments, the FETDRV terminal may be used by the master-mode charging IC 202a to initiate switching in the slave-mode charging IC 202b after the input current rises above a threshold level, in order to balance light-load and heavy-load efficiency. For example, switching losses at light load can outweigh the decreased conduction losses, which can be avoided by not enabling the slave-mode charging IC 202b right away. After enablement, the slave-mode charging IC 202b will operate in synchrony with the clock signal from the master-mode charging IC 202a. Control of the PWM driver circuit in the slave-mode charging IC 202b will be provided by the control signal from the master-mode charging IC 202a, thus allowing the master to set the charge current limit, input current limit, etc.

In accordance with the present disclosure, the delay element 218b may be configured (e.g., by selector 212) to provide a selectable phase shift that is suitable for dual-phase operation. For example, the delay element 218b may provide a 180° phase shift of the externally generated clock signal 404. Accordingly, the clock signal that is provided to the clock input of the PWM driver circuit in the slave-mode charging IC 202b is 180° out of phase relative to the clock signal in the master-mode charging IC 202a. Consequently, the charging cycle of the master-mode charging IC 202a will be 180° out of phase relative to the charging cycle of the slave-mode charging IC 202b. For example, when the high-side FET 214a is ON in the master device, the high-side FET in the slave device is OFF, and vice-versa.

Figure 5A:
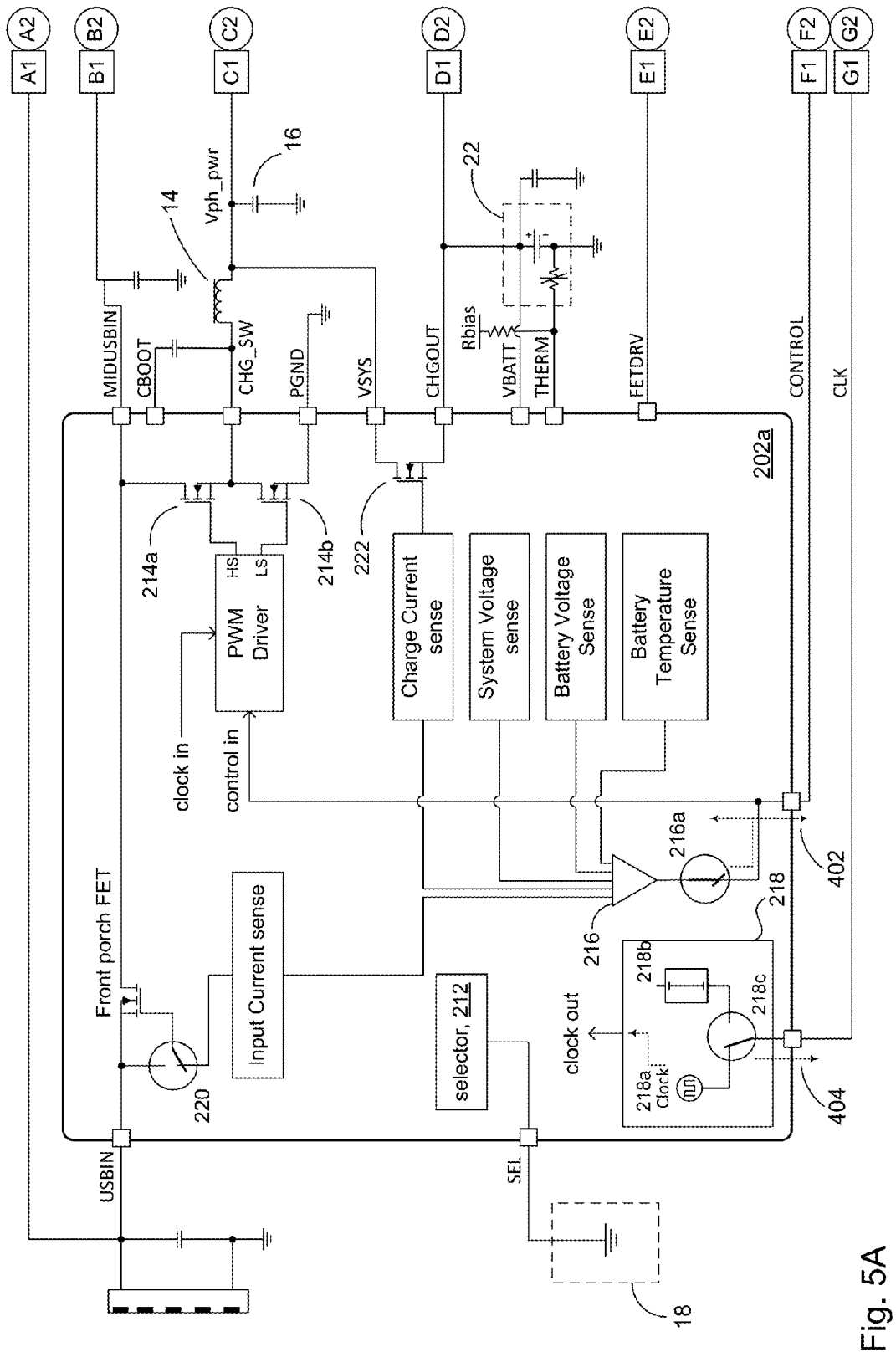
FIGS. 5A, 5B, and 5C show a 3-phase configuration of charging circuits in accordance with the present disclosure.
Figure 5B:
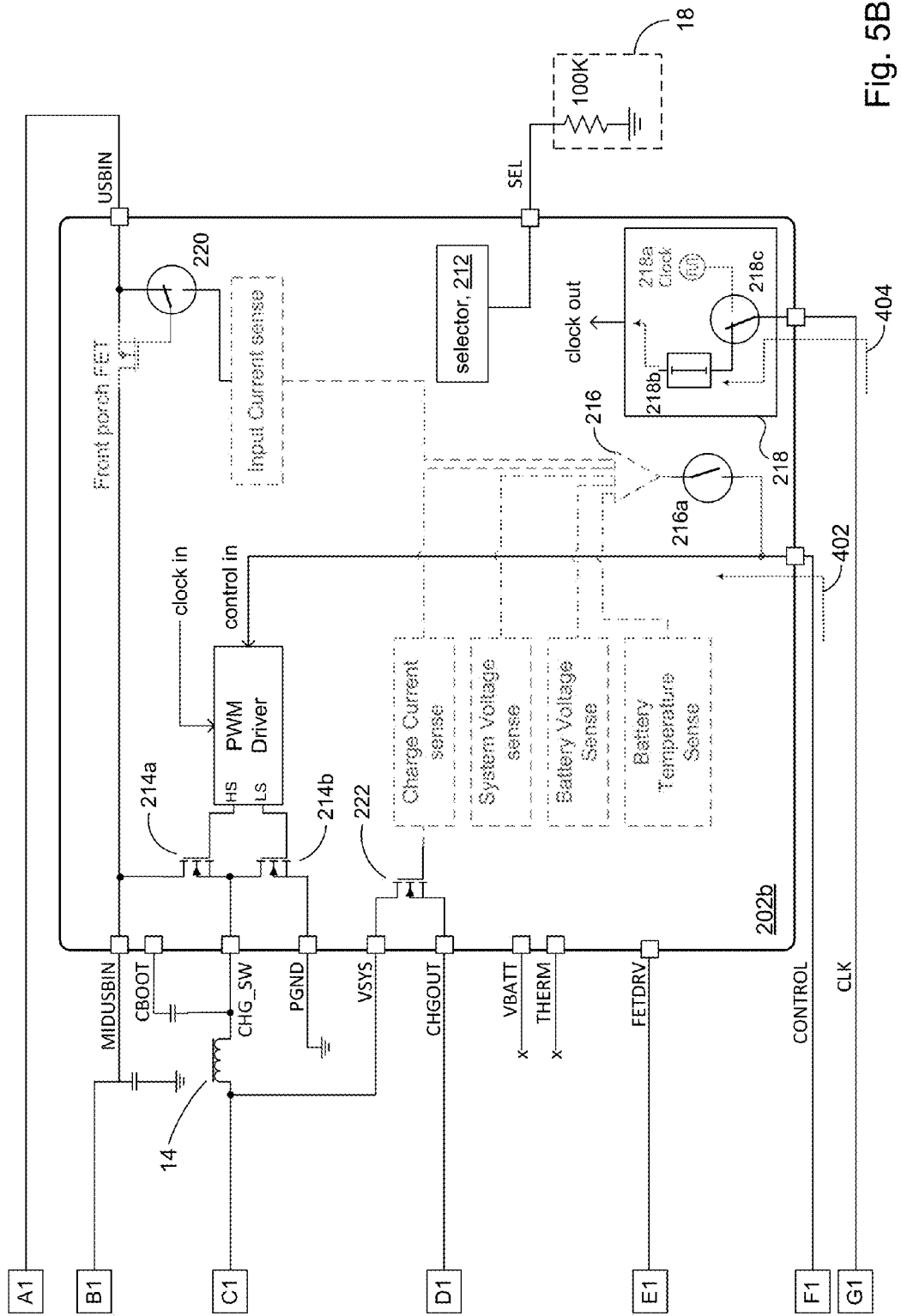
Figure 5C:
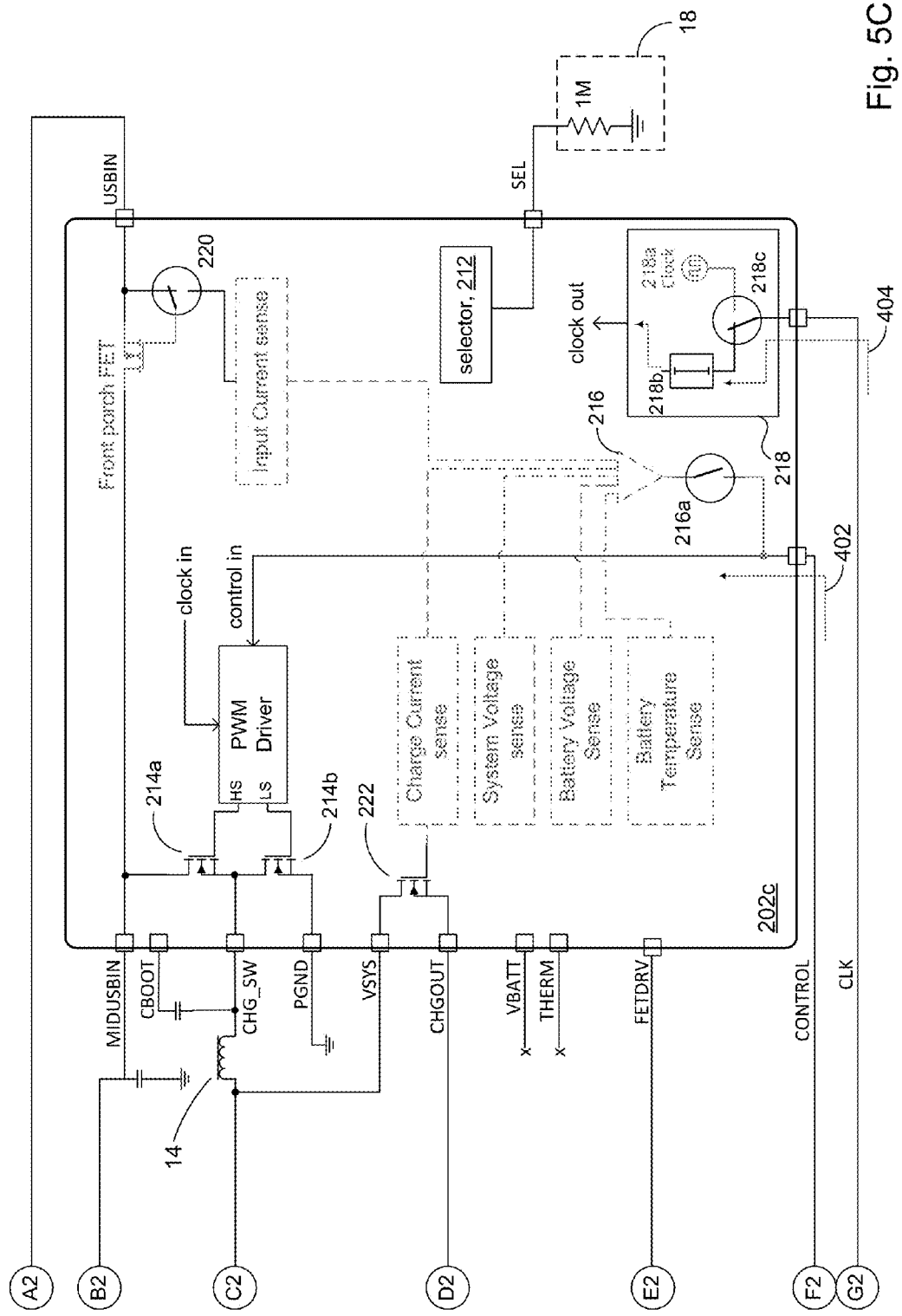

The discussion will now turn to a description of a 3-phase configuration of the charging IC 202 in accordance with the present disclosure. In a 3-phase configuration, three charging ICs 202 are connected and operate together to charge a battery 22. One of the charging ICs 202 may be configured as a master device and the other two as slave devices. FIGS. 5A-5C show an example charging ICs 202a, 202b, and 202c configured to operate respectively as a master device, a first slave device, and a second slave device. The charging ICs 202a, 202b, 202c are connected at connections A1, B1, C1, D1, E1, F1, and G1 and connections A2, B2, C2, D2, E2, F2, and G2.

The master device in FIG. 5A is configured as explained in connection with FIG. 4A. The first and second slave devices (FIGS. 5B and 5C) are configured as explained in connection with FIG. 4B. In 3-phase operation, the delay elements 218b in the first and second slave devices may be configured to provide 120° and 240° phase shifts, respectively, of the externally generated clock signal 404 as the clock input for the respective PWM driver circuits. For example, the selection indicator 18 in the first slave device of FIG. 5B may be a 100K resistor to indicate 120° phase shift, and similarly, the selection indicator 18 in the second slave device of FIG. 5C may be a 1M resistor to indicated 240° phase shift. It will be appreciated, of course, that other resistance values may be used. In operation, the charging cycle of the master device (FIG. 5A) will be 120° out of phase relative to the charging cycle of the first slave device (FIG. 5B) and 240° out of phase relative to the charging cycle of the second slave device (FIG. 5C).

It will be appreciated that, more generally, N-phase operation may be provided using N charging ICs (one master device and (N−1) slave devices) and connecting them in accordance with the examples shown in the figures. Each of the (N−1) slave devices receives from the master device the externally generated control signal 402 and the externally generated clock signal 404. In some embodiments, the $m^{th}$ slave device may be configured (e.g., using a suitable selection indicator 18) to provide an m×(360÷N)° phase shift (e.g., using the delay element 218b) of the externally generated clock signal 404 as the clock input for its PWM driver circuit. In some embodiments, the quantity (m÷N) is an integral multiple of 360.

Figure 6:
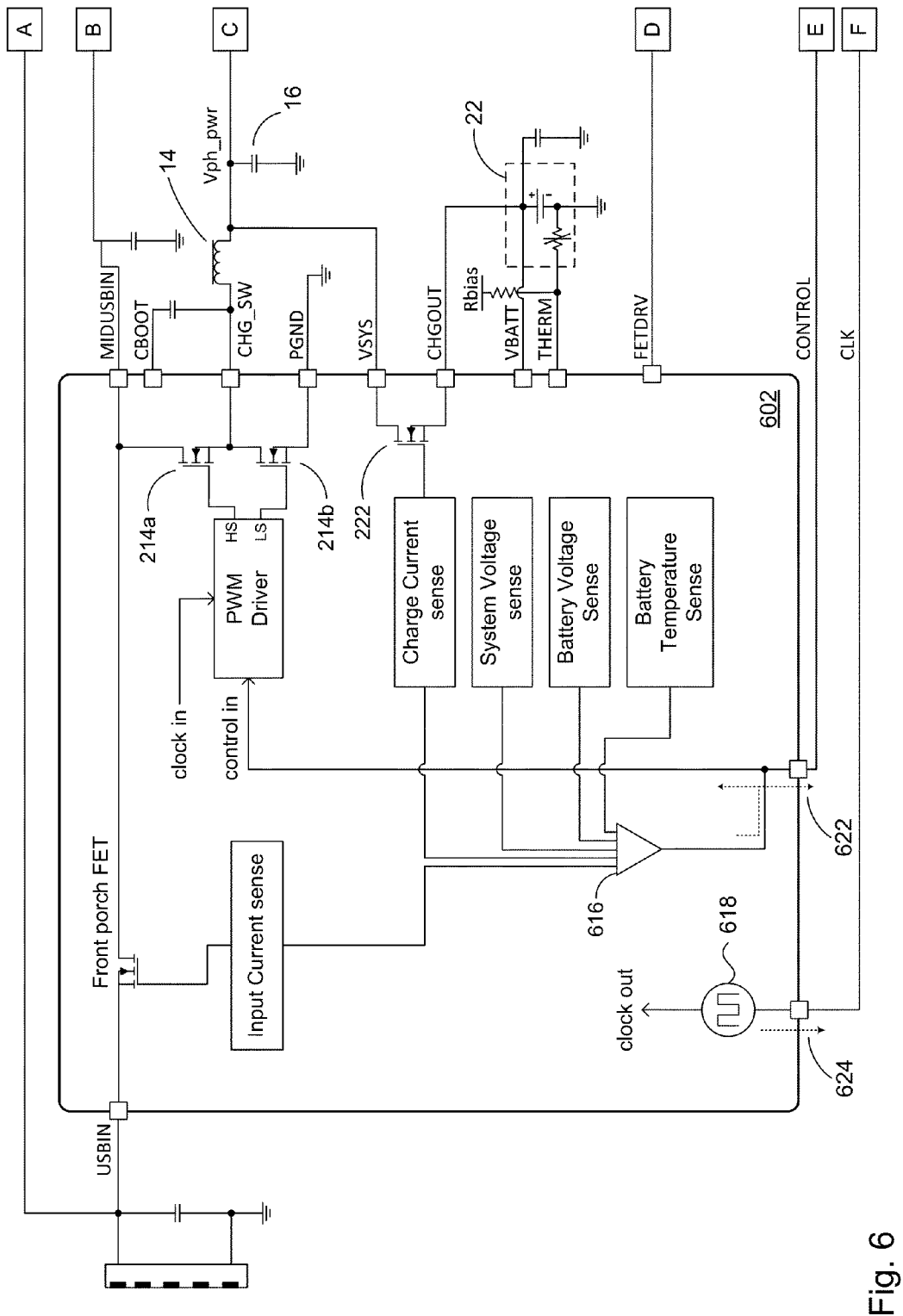
FIG. 6 illustrates an example of an implementation of a master-only charging circuit in accordance with the present disclosure.

The discussion will now turn to another embodiment of charging ICs in accordance with the present disclosure. In some embodiments, a charging IC may be implemented as a master-only device. In other words, the charging IC always operates in master mode and is not configurable to operate as a slave device. FIG. 6, for example, shows a charging IC 602 comprising, among other components, a feedback network comprising several sensor components (e.g., input current sense, charge current sense, etc.) that feed into a comparator 616. The comparator output generates an internally generated control signal that feeds into the control input of the PWM driver circuit and which serves as an externally generated control signal 622 that is output at the CONTROL terminal. The charging IC 602 further comprises a clock 618 that generates a clock signal that generates an internally generated clock signal, which feeds into the clock in of the PWM driver circuit, and which serves as an externally generated clock signal 624 that is output at the CLK terminal. This particular embodiment of charging IC always uses its internally generated control and clock signals and always outputs those signals as respective externally generated control and clock signals. As such, the charging IC 602 can omit selector 212, selectors 216a, 218b, and 220, and the delay element 218b in order to realize a smaller, lower cost device.

Figure 7:
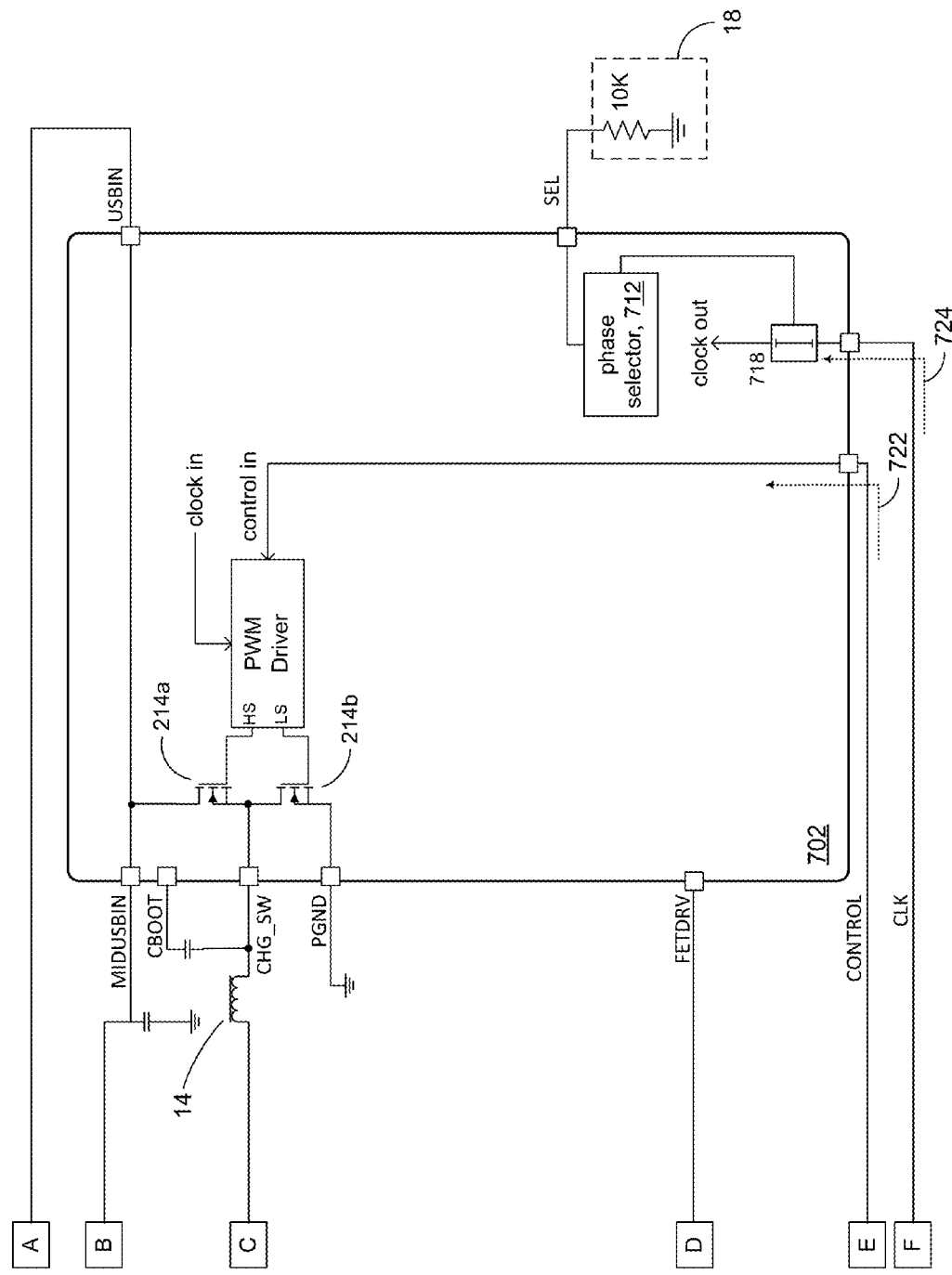
FIG. 7 illustrates an example of an implementation of a slave-only charging circuit in accordance with the present disclosure.

In some embodiments, a charging IC may be implemented as a slave-only device. FIG. 7, for example, shows a charging IC 702 comprising a PWM drive circuit having a control input that receives only an externally generated control signal 722 (e.g., from the CONTROL terminal). The PWM driver circuit, furthermore, has a clock input that receives only an externally generated clock signal 724 (e.g., from the CLK terminal). The selector 712 serves to configure a delay element 718 to provide phase shifting of the externally generated clock signal 724 according to the selection indicator 18. For example, the delay element 718 may be configured to provide an m×(360÷(M+1))° phase shift of the externally generated clock signal depending on what is connected to the selector 712, where m identifies the charging IC 702 as being the $m^{th}$ slave device among a total of M slave devices.

The charging IC 702 is "slave-only" in the sense that it does not generate its control and clock signals internally, but rather obtains them from a source external to the charging IC. Since the control signal and clock signal are always externally generated, the slave-only charging IC 702 can omit the circuitry comprising the feedback network and the clock. Likewise, the slave-only charging IC 702 can omit the input FET and battery FET, since the device does not need to sense the input current. This can be advantageous in terms of a smaller device and/or a lower cost device, especially since the input and battery FETs are power FETs which can occupy significant areas on the die.

In some embodiments, the slave-only charging IC 702 may include additional circuitry to enhance performance. Though not illustrated, for example, a slave-only charging IC may include inductor current sense circuitry for peak current limiting. As another example, a slave-only charging IC may additionally include a thermal loop to ensure the junction temperature does not exceed a maximum operating limit.

Figure 8A:
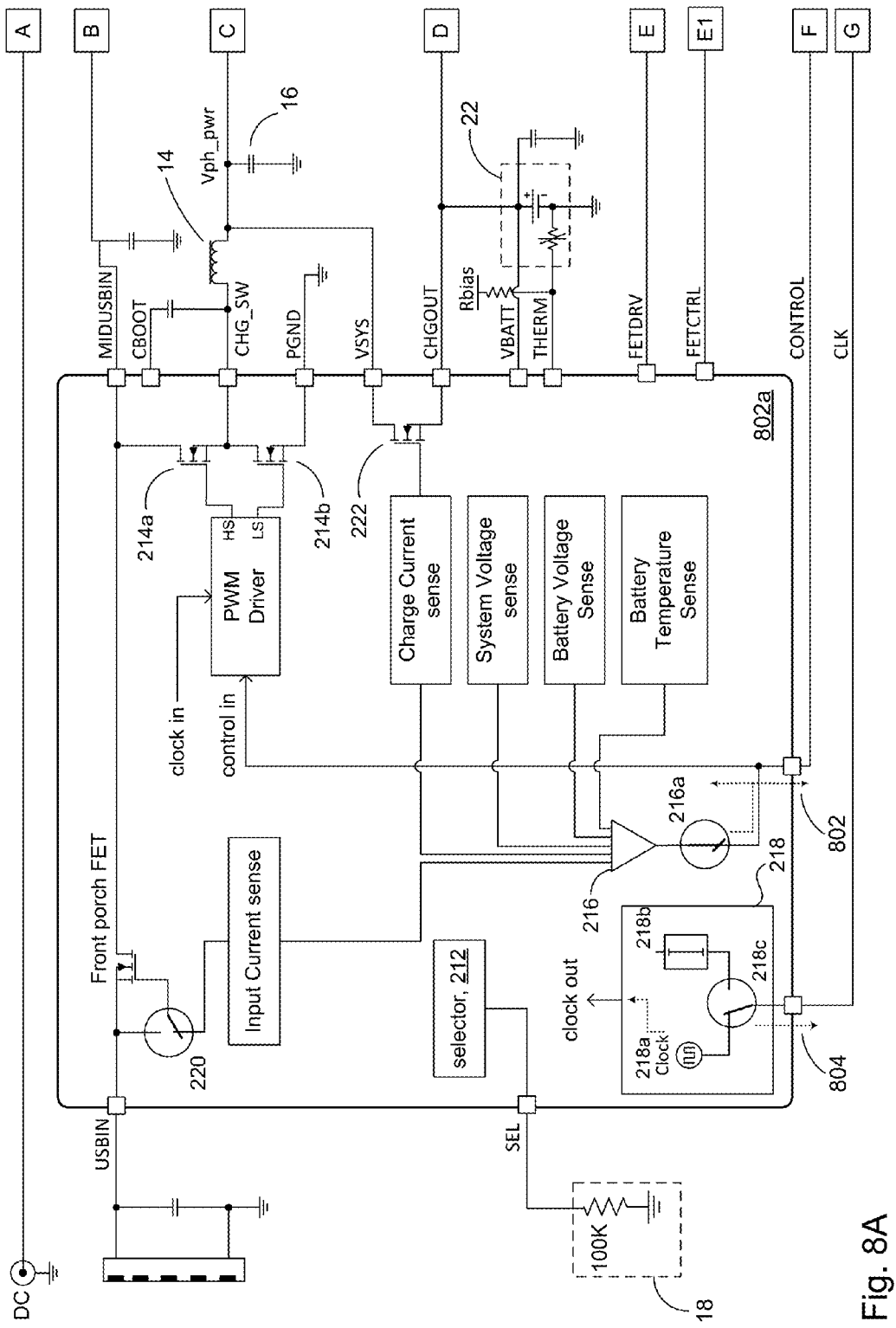
FIGS. 8A, 8B, and 8C illustrate an embodiment for a dual-input master-slave configuration.
Figure 8B:
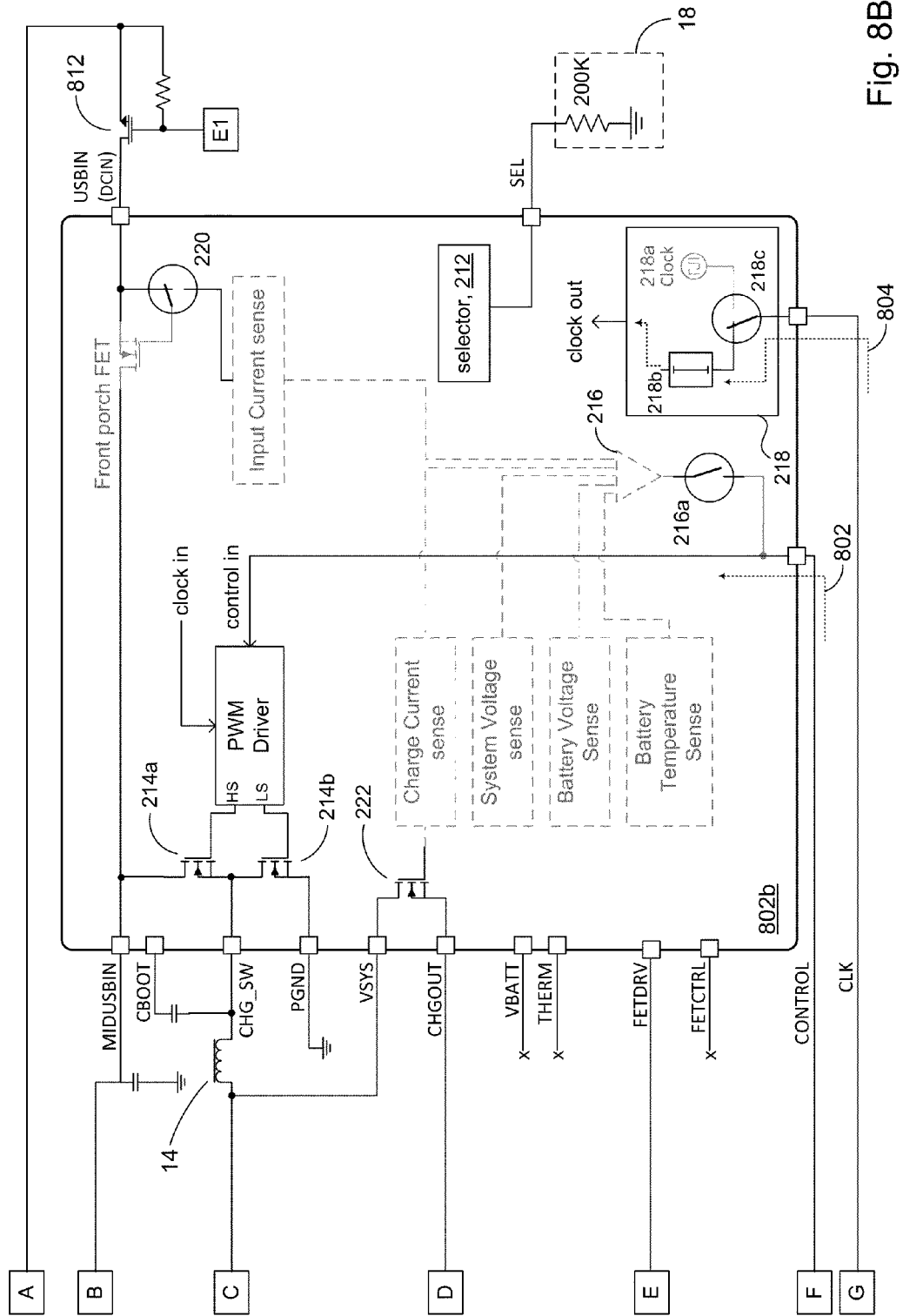
Figure 8C:
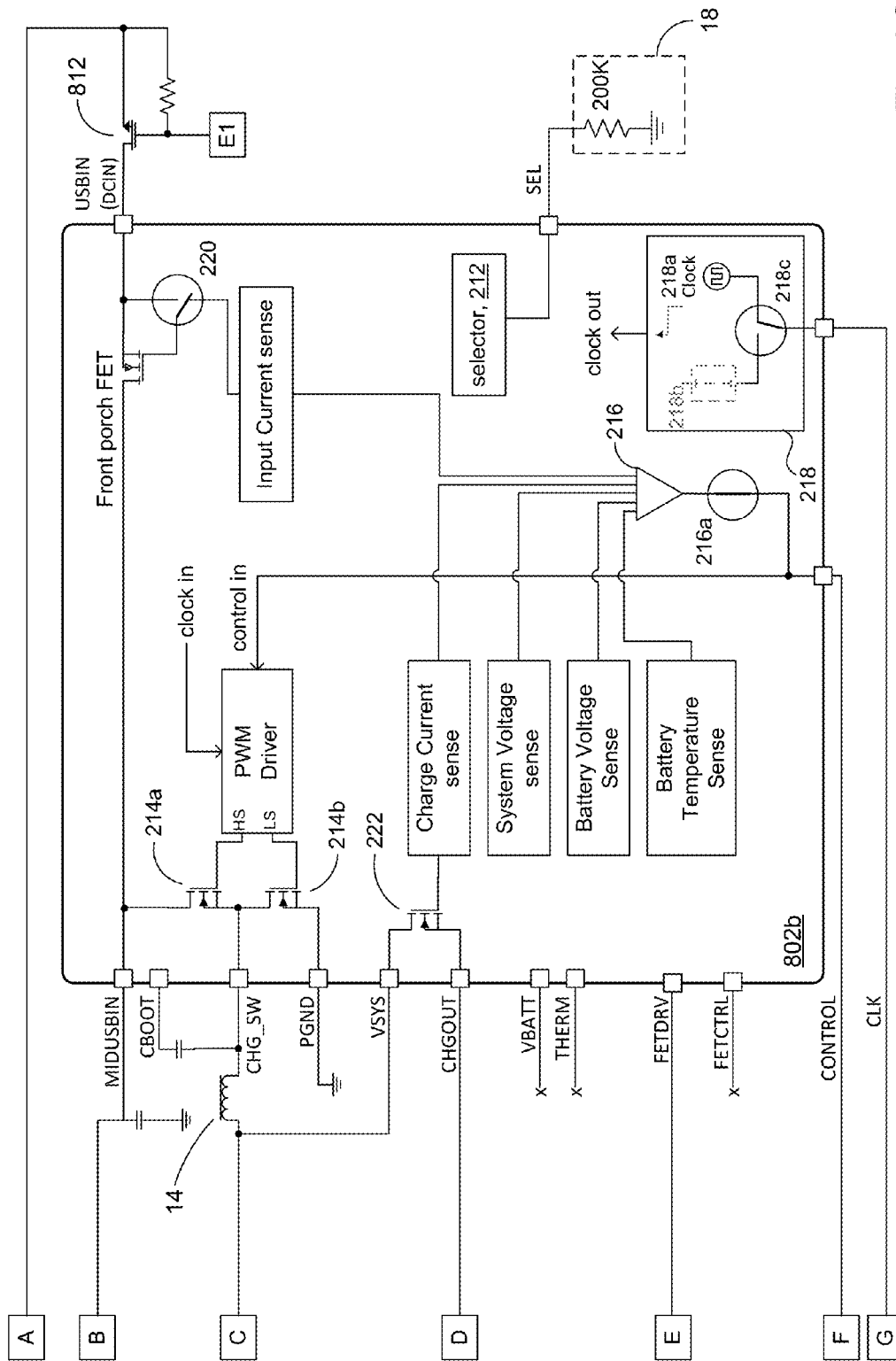

The discussion will now turn to a description of a dual-input two-phase master-slave configuration. Referring to FIGS. 8A, 8B, and 8C, a charging IC in accordance with the present disclosure may further include a FETCRTL terminal. FIG. 8A shows the charging IC 802a configured as a dual-input master. In a particular embodiment, for example, the dual-input master configuration may be indicated with a selection indicator 18 that comprises a 100KΩ resistor. FIG. 8B shows the charging IC 802b configured as a dual-input slave, operating in slave mode. FIG. 8C shows the charging IC 802b operating in master mode. In a particular embodiment, the dual-input slave configuration may be indicated using a selection indicator 18 that comprises a 200KΩ resistor. The configuration is "dual-input" in the sense that there are two voltage inputs. A first voltage input (e.g., USBIN) may be connected to the dual-input master 802a and a second voltage input (e.g., DCIN) may be connected to the dual-input slave 802b via a DCIN FET 812, as illustrated in FIGS. 8A-8C for example.

In operation, when there is a voltage on USBIN terminal of the dual-input master 802a, the dual-input configured charging ICs 802a and 802b operate in a master/slave mode as explained above. For example, the dual-input master 802a generates a feedback control signal 802 that is used by the master and provided to the slave (FIG. 8B) via the CONTROL terminal. Likewise, the dual-input master 802a generates a clock signal 804 that is used by the master and provided to the slave via the CLK terminal. The dual-input slave 802b shown in FIG. 8B uses the externally provided control signal 802 and clock signal 804 to control its PWM driver circuit. In addition, the dual-input master 802a asserts FETCTRL (e.g., goes high-z) to turn OFF the DCIN FET 812 that is connected to the dual-input slave 802b. This serves to electrically isolate the DCIN voltage source (if present) from the USBIN (DCIN) terminal of the dual-input slave 802b. The dual-input master 820a asserts FETDRV (e.g., pulls HIGH) to signal the dual-input slave 802b to operate in slave mode.

When there is no voltage on the USBIN terminal of the dual-input master 802a, the master does not perform battery charging. The dual-input master 802a will assert FETCTRL (e.g., goes LOW) to turn ON the DCIN FET 812 to allow current flow from the DCIN voltage source. The dual-input slave 802b operates in master mode to perform battery charging using the DCIN input provided on its USBIN terminal. This master operating mode of the dual-input slave 802b is illustrated in FIG. 8C. Notably, the dual-input slave 802b does not receive an external control signal or clock signal on its CONTROL and CLK terminals, since the dual-input master 802a is not performing battery charging. Instead, the dual-input slave 802b generates its own control and clock signals and performs battery charging from DCIN in master mode.

Figure 9:
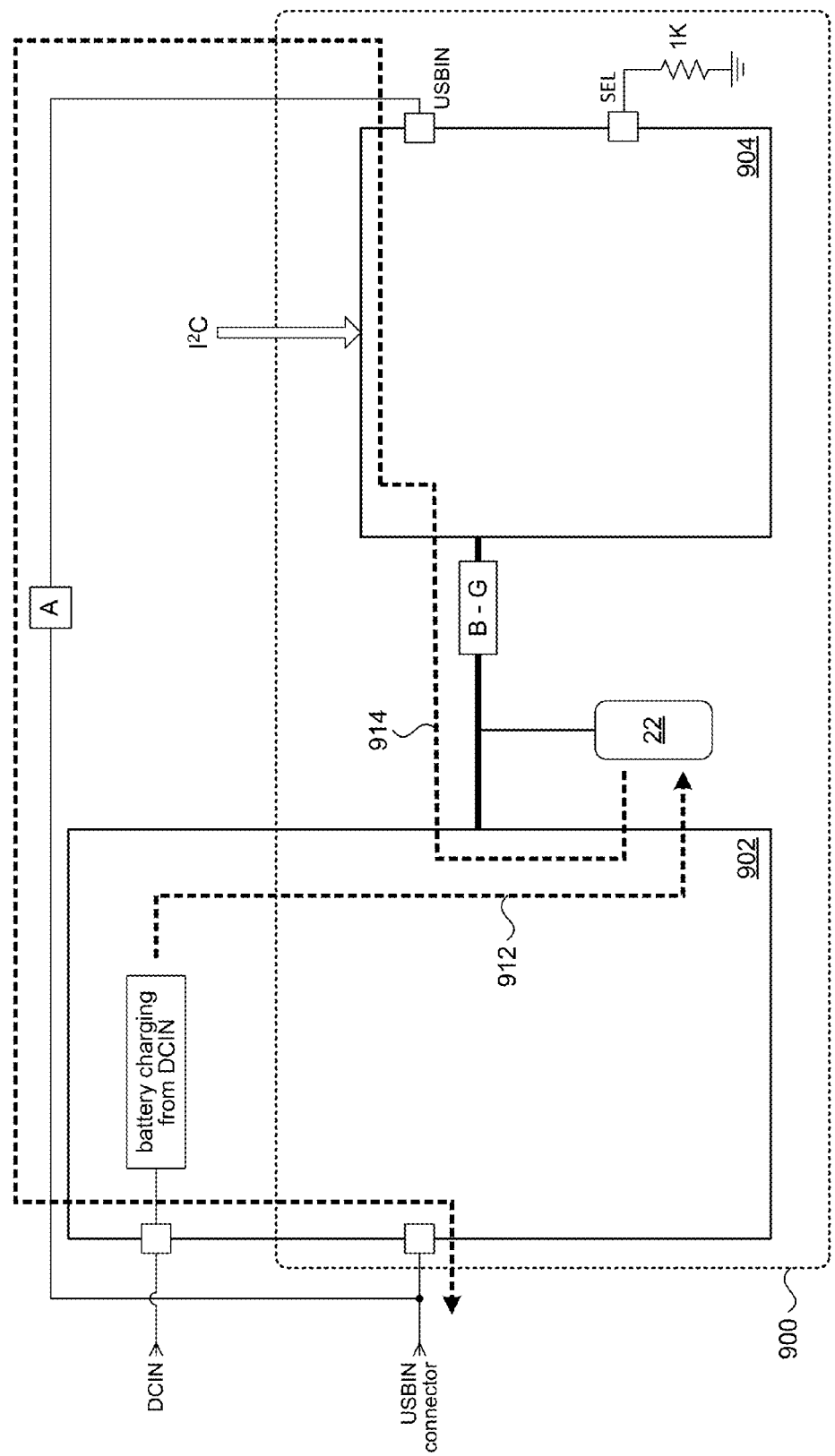
FIG. 9 illustrates an embodiment for a dual-input master.

The discussion will now turn to a description of a multi-phase master-slave configuration using, as the master device, a charging IC of the present disclosure configured for two voltage source inputs. FIG. 9 illustrates a dual-input charging IC 902 configured with a charging IC 904 configured for slave mode operation. The bounding box 900 is used to indicate that device 904 and a portion of device 902 are configured as illustrated in FIGS. 4A and 4B. In some embodiments, the device 902 may be configured to always operate in master mode. The device 904 may be configured with a selection indicator comprising a 1 kΩ resistor to indicate that the slave may operate in on-the-go (OTG) mode.

In operation, when charging from USBIN, the devices 902, 904 may operate in master/slave mode to provide multi-phase charging of the battery 22 as explained in the foregoing embodiments. However, when device 902 is charging from DCIN, the device 904 may be signaled to operate in OTG mode. For example, device 904 may include interface circuitry (not shown) to receive a command via the Inter-Integrated Circuit (I²C) communication protocol. It will be appreciated, of course, that any other suitable signaling may be used.

In OTG mode, the device 904 provides power from the battery 22 directly to the USBIN terminal. FIG. 9 illustrates the two different current flows 912, 914 in this "OTG" mode of operation. Flow 912 represents charging current from the dual-input charging IC 902 to charge battery 22. Flow 914 represents current from battery 22 to the USBIN terminal of device 902. It is noted that though control and clock signals from device 902 may be provided on its respective CONTROL and CLK terminals, the signals are not used by the device 904 in OTG mode.

ADVANTAGES AND TECHNICAL EFFECT

Charging circuitry in accordance with the present disclosure allow for the paralleling of multiple battery chargers. Each battery charger is connected to its own inductive element, thus creating an opportunity for improved thermal performance by allowing for the use of smaller inductors. In addition, the smaller inductors allows for smaller packaging footprints. Multiple battery chargers allow for current sharing, thus distributing the power load among the battery chargers. Since each battery charger operates out of phase relative to the other battery chargers, the battery "sees" a charging current that has reduced ripple.

Another advantage of embodiments according to the present disclosure is flexibility in system design. Each battery charger may be used in a single phase standalone configuration, or in a multi-phase configuration of two or more devices.

Additional flexibility can be realized by incorporating a master device in larger a power management IC. A particular user may then design a multi-phase configuration by simply adding one or more slave-configured devices to their system.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

We claim the following:

1. A circuit for a battery charger, the circuit comprising:
    a switching circuit having a control input, a clock input, and a switching output configured to connect to an inductive element;
    a charging terminal configured to electrically connect the inductive element to a battery terminal to provide power to charge a battery connected to the battery terminal;
    a control terminal;
    a clock terminal;
    a control selector configured to operate in a first configuration that provides an internally generated control signal to the control terminal and the control input of the switching circuit, and to operate in a second configuration that provides an externally generated control signal received on the control terminal to the control input of the switching circuit; and
    a clock selector configured to operate in a first configuration that provides an internally generated clock signal to the clock terminal and the clock input of the switching circuit, and to operate in a second configuration that provides an externally generated clock signal received on the clock terminal to the clock input of the switching circuit.

2. The circuit of claim 1 further comprising a first FET and a second FET connected to the switching output of the switching circuit, the first FET being connected to the second FET, the first FET and the second FET being switched ON and OFF by the switching circuit in accordance with control signal received on the control input and a clock signal received on the clock input.

3. The circuit of claim 1 further comprising a delay element that can be selectively connected by the clock selector between the clock input and the clock terminal to provide an externally generated clock signal received on the clock terminal to the clock input.

4. The circuit of claim 3 wherein the delay element is configured to provide a selectable phase shift of the externally generated clock signal.

5. The circuit of claim 1 further comprising a clock signal generator to generate the internally generated clock signal; and a delay element,
wherein the clock selector, when operating in the first configuration, connects the clock signal generator to the clock terminal and the clock input of the switching circuit,
wherein the clock selector, when operating in the second configuration, connects the delay element between the clock input and the clock terminal to provide an externally generated clock signal received on the clock terminal to the clock input.

6. The circuit of claim 5 wherein the delay element is configured to produce a phase shift of the externally generated clock signal.

7. The circuit of claim 1 further comprising a control signal generator to generate the internally generated control signal,
wherein the control selector, when operating in the first configuration, connects the control signal generator to the control terminal and the control input of the switching circuit,
wherein the control selector, when operating in the second configuration, connects the control terminal to the control input to provide an externally generated control signal received on the control terminal to the control input.

8. The circuit of claim 1 further comprising a selector input configured to connect to an external selection indicator, wherein the control selector and the clock selector operate in the first or second configuration depending on the selection indicator.

9. The circuit of claim 8 wherein the delay element is configured to produce a phase shift of the externally generated clock signal depending on the selection indicator.

10. The circuit of claim 8 wherein the external selection indicator is a digital signal.

11. The circuit of claim 8 wherein the external selection indicator is an analog signal.

12. The circuit of claim 8 wherein the external selection indicator comprises one or more resistor elements.

13. A method in a circuit comprising:
selecting a clock signal from either an internal clock signal generated by a clock generator of the circuit or an external clock signal provided at a clock terminal of the circuit;
selecting a control signal from either an internal control signal generated by a control signal generator of the circuit or an external control signal provided at a control terminal of the circuit; and
controlling a switching circuit using the selected clock signal and the selected control signal to produce power at a power output terminal of the circuit.

14. The method of claim 13, further comprising sensing a selection signal and selecting the clock signal and the control signal in response to the selection signal.

15. The method of claim 14, wherein sensing the selection signal includes sensing an external signal provided at a selection terminal of the circuit.

16. The method of claim 13, wherein when the external clock signal is selected then phase-shifting the external clock signal and controlling the switching circuit using the phase-shifted clock signal.

17. The method of claim 13, wherein when the internal clock signal is selected then providing the internal clock signal on the clock terminal of the circuit.

18. The method of claim 13, wherein when the internal control signal is selected then providing the internal control signal on the control terminal of the circuit.

19. The method of claim 13, further comprising charging a battery using the power produced at the power output terminal of the circuit.

20. A circuit comprising:
means for selecting a clock signal from either an internal clock signal generated by a clock generator of the circuit or an external clock signal provided at a clock terminal of the circuit;
means for selecting a control signal from either an internal control signal generated by a control signal generator of the circuit or an external control signal provided at a control terminal of the circuit; and
means for producing power at a power output terminal of the circuit using the selected clock signal and the selected control signal.

* * * * *